United States Patent [19]

Shimada

[11] 3,999,922

[45] Dec. 28, 1976

[54] ROTARY TABLETING MACHINE

[76] Inventor: Yasuo Shimada, 104 Minamikamiai-cho, Nishinokyo, Nakakyo, Kyoto, Japan

[22] Filed: Apr. 16, 1975

[21] Appl. No.: 677,751

[52] U.S. Cl. .............................. 425/210; 425/345; 425/353; 425/354

[51] Int. Cl.² ..................... B30B 11/08; B29C 1/00

[58] Field of Search .......... 425/210, 345, 352, 353, 425/354

[56] References Cited

UNITED STATES PATENTS

| | | | |
|---|---|---|---|
| 2,043,086 | 6/1936 | Westin et al. | 425/210 X |
| 2,638,626 | 5/1953 | Golwynne | 425/210 X |
| 2,997,741 | 8/1961 | Crossley | 425/345 X |
| 3,671,157 | 6/1972 | Smith | 425/345 X |

*Primary Examiner*—J. Howard Flint, Jr.
*Attorney, Agent, or Firm*—George B. Oujevolk

[57] ABSTRACT

A rotary tableting machine has a detachable covering enclosing the principal part of the machine including a turntable. Clean air is introduced into the interior of the covering to collect the powder which is scattered in the air due to the operation of the machine and which would otherwise cause various troubles and stain the room.

10 Claims, 2 Drawing Figures

ROTARY TABLETING MACHINE

BACKGROUND OF THE INVENTION

The present invention relates to rotary tableting machines, and more particularly to a rotary tableting machine equipped with a covering for enclosing the turntable and the like of the machine to introduce clean air into the interior of the covering and to thereby collect the powder scattered in the interior.

Generally when the rotary tableting machine is operated, the powder is fed by a hopper onto a turntable rotating at a high speed and is placed into dies in the turntable by a feeder. Upper and lower punches operate to compress the powder in the dies, and the molded tablets are pushed upward out of the dies by the lower punches thereafter raised and are then discharged via a chute.

The tableting operation usually entails the problem that the powder scattered or strewn in the air accumulates in the interior of the machine, causing various troubles, and stain the room.

In view of the recent attempts made by various countries to set up standards for the production and quality control of pharmaceuticals, the above-mentioned problem of the powder scattered in the air is most serious.

In order to overcome this problem, it has been chiefly practiced to introduce clean air into the interior of a covering enclosing the whole tableting machine or to collect the powder in the inside of the covering. However, the former method has the fatal drawback that the scattered powder accumulates in internal portions of the machine, whereas with the latter method the rate of collection of the powder is invariably lower than the speed of rotation of the turntable, permitting a large amount of powder to remain in the interior of the machine.

SUMMARY OF THE INVENTION

The main object of this invention is to overcome the drawbacks heretofore experienced with rotary tableting machines.

More specifically, a first object of this invention is to provide an improved rotary tableting machine in which scattering powder is confined in a minimized space and which therefore permits collection of powder with ease.

A second object of this invention is to provide an improved rotary tableting machine which is equipped with a covering enclosing the turntable and other elements of the machine, such that clean air is introduced into the interior of the covering to effectively collect the powder scattered therein.

A third object of this invention is to provide an improved rotary tableting machine equipped with the above-mentioned covering which is readily removable to render the machine easy to clean.

To attain the foregoing objects, this invention provides a rotary tableting machine characterized by a detachable covering enclosing a turntable, an upper punch holding disc and a lower punch holding disc to introduce clean air into the interior of the covering and to thereby collect the powder scattered therein.

According to a preferred feature of this invention, the covering is so formed that the clean air can be introduced into the covering along the inside peripheral surface thereof so as to pass the air circumferentially of the covering.

According to another preferred feature of this invention, the covering is provided with a dust collector having a front end extending into the covering through a dust collecting aperture formed in a side wall of the covering, so that the powder scattered inside the covering can be collected by the dust collector.

According to another preferred feature of this invention, the covering comprises a stand frame side cover, a feeder side upper cover and a feeder side lower cover and is separable into these covers for removal.

According to still another preferred feature of this invention, the tableting machine is wholly covered with a closure to introduce clean air into the interior of the closure.

These objects and features of this invention will become apparent from the following detailed description and the accompanying drawings.

DETAILED DESCRIPTION

Figure 1:
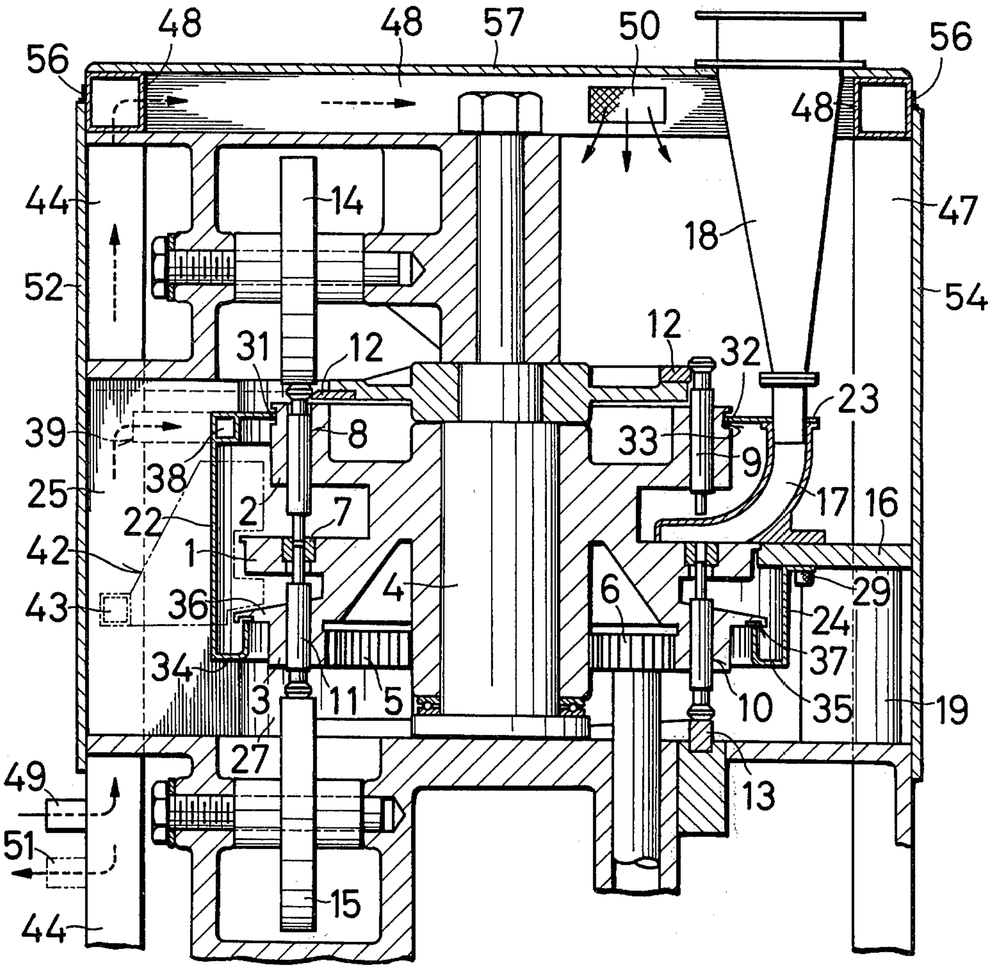
FIG. 1 is a view in vertical section showing a rotary tableting machine embodying this invention.
Figure 2:
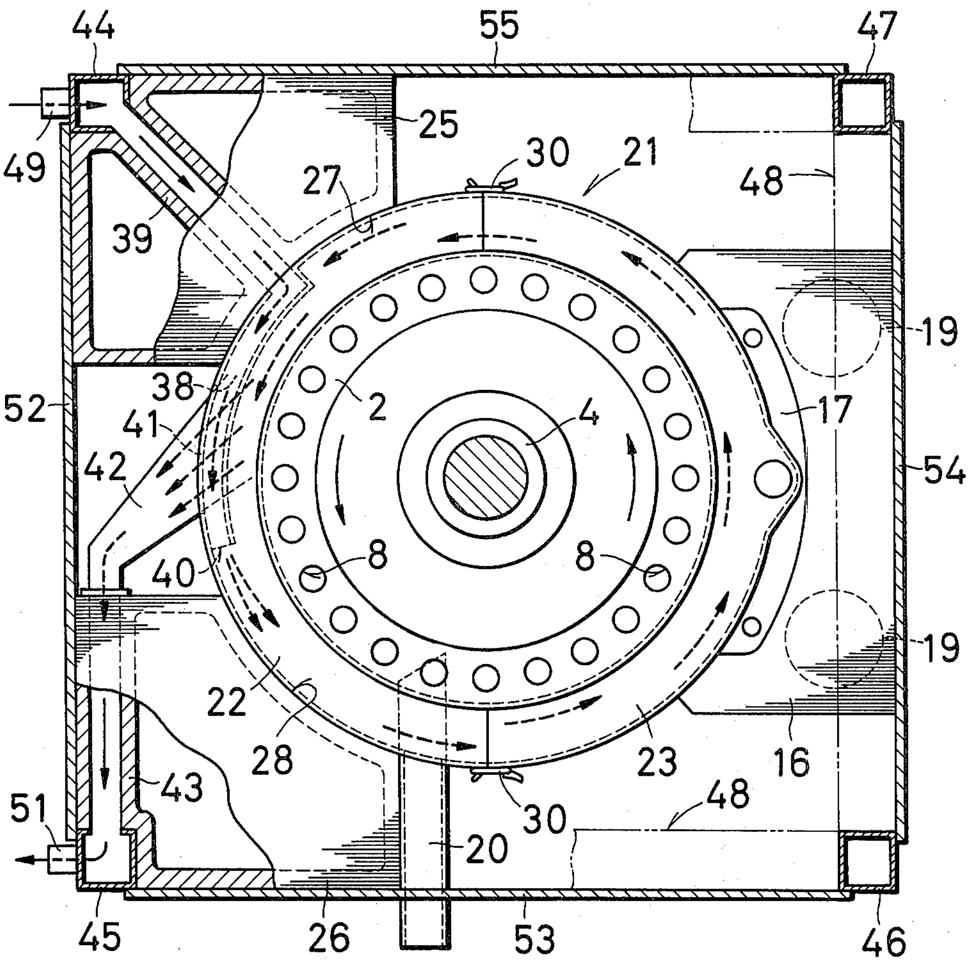
FIG. 2 is a plan view of the rotary tableting machine shown in FIG. 1 as it is seen from above an upper punch holding disc.

With reference to FIGS. 1 and 2, a turntable 1, an upper punch holding disc 2 and a lower punch holding disc 3 are integral and are rotatably mounted on a shaft 4 coaxially therewith.

The turntable 1 and the other discs are rotatable at a constant speed by virtue of the meshing engagement between an inner gear 5 provided on the inner periphery of the lower punch holding disc 3 and a pinion 6 to be driven by a prime mover.

The turntable 1 is formed with a large number of dies 7 at a suitable spacing. The upper punch holding disc 2 positioned immediately above the dies 7 has bores 8 receiving therein upper punches 9 respectively. Similarly the lower punch holding disc 3 positioned immediately below the dies 7 has bores 10 receiving lower punches 11 respectively.

An upper punch guide rail 12 for guiding the upper punches 9 at an appropriate level is disposed above the upper punch holding disc 2, while a lower punch guide rail 13 is disposed below the lower punch holding disc 3 to guide the lower punches 11.

At a compressing position, an upper compressing roll 14 is located above the disc 2 and a lower compressing roll 15 below the disc 3.

At a powder feeding position, there is provided a feeder support 16 on one side of the turntable 1. A feeder 17 for feeding powder to the dies 7 in the turntable 1 is detachably mounted on the support 16. The lower end of a hopper 18 is fitted in the upper end of the feeder 17. A leg 19 for supporting the support 16 is integral with the support 16. Indicated at 20 is a chute for discharging the molded tablets.

A covering 21 for enclosing the turntable 1, upper punch holding disc 2 and lower punch holding disc 3 comprises three separate portions, namely a cover 22 adjacent stand frames (i.e. stand frame side cover), an upper cover 23 adjacent the feeder (i.e. feeder side upper cover) and a lower cover 24 adjacent the feeder (i.e. feeder side lower cover).

The stand frame side cover 22 constitutes the left half of the covering 21. As best seen in FIG. 2, a pair of stand frames 25 and 26 are provided to the rear and front of the turntable 1 and the discs on the left-hand side thereof, and the outer peripheral surface of the cover 22 is supported by the circular arc side walls 27 and 28 of the stand frames 25 and 26. The feeder side upper cover 23 constitutes the upper half of the remaining right half of the covering 21 and is placed on, and attached to, the upper end of the feeder 17. The feeder side lower cover 24 constitutes the lower half of the right half of the covering 21 and is secured to the under side of the feeder support 16 by a screw 29. The cover 22 is connected to the upper cover 23 or to the lower cover 24 by connectors 30. The cover 22 is detachable from the latter cover by a single action. The upper ends 31 and 32 of the stand frame side cover 22 and the feeder side upper cover 23 are inserted into a laterally open groove 33 formed in the outer peripheral surface on an upper portion of the upper punch holding disc 2, with a small clearance provided between the upper ends and the grooved portion.

The lower portions 34 and 35 of the cover 22 and the lower cover 24 are bent inward to a U-shaped section. The ends of the lower portions 34 and 35 are inserted into a downwardly open groove 37 formed in the under side of a powder receiving portion 36 of the lower punch holding disc 3.

The upper portion of the cover 22 is provided, on its inner peripheral surface, with a circular arc inlet tube 38 for introducing clean air into the interior of the cover 22 along the inner peripheral surface of the cover 22. The inlet tube 38 is in communication with an inlet duct 39 provided inside the stand frame 25. The inlet tube 38 has an opening 40.

The cover 22 is formed in its side wall a dust collecting aperture 41 through which the front end of a dust collector 42 extends inward. The other end of the dust collector 42 communicates with an outlet duct 43 provided inside the stand frame 26.

As best illustrated in FIG. 2, the tableting machine embodying this invention is provided at its four corners with posts 44, 45, 46 and 47 joined at their upper ends to a quadrilateral frame 48. These posts and frame are made of tubular members respectively. The post 44 has at its lower end a clean air inlet 49 communicating with the inlet duct 39 provided inside the stand frame 25 and with the interior of the quadrilateral frame 48. The quadrilateral frame 48 has a clean air outlet opening 50 in an inner side wall thereof. The post 45 has at its lower end a dust-containing air discharge outlet 51 communicating with the outlet duct 43 in the stand frame 26.

A closure comprises openable closure members 52, 53, 54 and 55 attached to the outside surfaces of the posts 44, 45, 46, 47 and frame 58 by hinges 56. The closure further includes a closure member 57 attached to the top surface of the frame 48.

When the prime mover is actuated to operate the tableting machine, the pinion 6 is driven which in turn drives the inner gear 5 on the inner periphery of the lower punch holding disc 3 in meshing engagement therewith, rotating the disc 3, turntable 1 and the upper punch holding disc 2 about the shaft 4.

The hopper 18 feeds the powder onto the turntable 1 which is rotating at a high speed. The feeder 17 places the powder into the dies 7 formed in the turntable 1. On each pair of the upper punches 9 and the lower punches 11 reaching the compressing position while being guided by the guide rails 12 and 13, the upper and lower compressing rolls 14 and 15 cause the punches to compress and mold the powder in the corresponding die 7. The molded powder, i.e. tablet, is pushed up above the turntable 1 by the raised lower punch 11 and is withdrawn by the chute 20.

As already described, the tableting operation scatters the powder in the air, allowing the scattered powder to accumulate in the interior of the machine to cause various troubles or staining the room. However, this problem has been overcome by the most significant operation of the machine of this invention as will be described below.

With the present tableting machine, the turntable 1 and the discs which cause the scattering of the powder are enclosed with the covering 21, which therefore confines the scattering of the powder to the interior of the covering. The minimized space defined by the covering 21 makes it easy to collect the powder.

The powder scattered within the covering 21 will be collected in the following manner. When clean air is fed to the clean air inlet 49 at the lower end of the post 44, part of the air flows through the post 44, then through the inlet duct 39 in the stand frame 25 and into the circular arc inlet tube 38 on the stand frame side cover 22. The air is then forced out from the opening 40 into the interior of the cover 22 along the inner peripheral surface of the cover 22. The air turns round along the inner side of the covering 21, while blowing away the scattered powder within the covering 21, and flows out through the dust collecting aperture 41 of the cover 22 into the dust collector 42, from which it is led through the outlet duct 43 in the stand frame 26 into the post 45. The air is run off from the machine via the discharge outlet 51 at the lower end of the post 45.

In this way, a major portion of the powder scattered within the covering 21 is collected. The rest of the powder falls along the inner peripheral surfaces of the stand frame side cover 22 and the feeder side lower cover 24 or slides down the powder receiving portion 36, accumulating on the lower portions 34 and 35 of U-shaped section.

The powder accumulating in the lower portions 34 and 35 will be removed by the following procedure.

First, the closure member 54 is opened upward, and the feeder side upper cover 23 or lower cover 24 is released from the stand frame side cover 22 simply by disengaging the connectors 30. After withdrawing the lower end of the hopper 18 from the upper end of the feeder 17, the upper cover 23 is removed along with the feeder 17 by drawing them rightward. Subsequently, the lower cover 24 and feeder support 16 are pulled rightward and removed. The lower cover 24 is detachable from the feeder support 16 by removing the screw 29.

To remove the cover 22 adjacent the stand frames, the cover 22 is turned in a circumferential direction to the powder feeding position. In the same manner as the upper cover 23 and lower cover 24, the cover 22 is then drawable to the right away from the turntable 1.

Since the cover 22, upper cover 23 and lower cover 24 are readily removable from their specified positions surrounding the turntable 1 and the like, the powder is easily removable from the interior, and the parts including the turntable 1 can be cleaned also easily.

On the other hand, the air supplied to the air inlet 49 in the post 44 partially flows through the post 44 into the quadrilateral frame 48 joined to the upper end of the post 44. The air then flows out from the clean air outlet opening 50 formed in the frame 48 into the interior of the closure enclosing the whole tableting machine, namely inside the closure members 52, 53, 54, 55 and 57, consequently increasing the air pressure within the closure. The high air pressure serves to confine the scattering inside particles in the interior of the covering 21.

In the foregoing construction, the stand frame side cover 22 and the feeder side upper cover 23 are inserted in the laterally open groove 33 in the upper punch holding disc 2, with a small clearance formed between the upper ends 31, 32 and the grooved portion 33. This hinders the powder from escaping outward from the covering 21 and also permits the clean air to be withdrawn into the interior of the covering 21 from outside, namely from inside the closure members 52, 53, 54, 55 and 57 when a high dust collecting force is acting in the interior, consequently making it more difficult for the powder to escape from the covering 21. Similarly the same effects as above are attainable by the insertion of the stand frame side cover 22 and the lower cover 24 in the lower punch holding disc 3, namely by the insertion of the ends of the lower portions 34, 35 in the downwardly open groove 37.

Although this invention has been described above with reference to a specific embodiment, it is to be understood that the embodiment can be modified variously within the scope of the appended claims.

I claim:

1. A rotary tableting machine comprising a detachable covering enclosing a turntable, an upper punch holding disc and a lower punch holding disc to introduce clean air into the interior of the covering and to thereby collect powder scattered therein.

2. A rotary tableting machine as defined in claim 1 wherein the clean air is introduced into the covering along the inside peripheral surface thereof to pass the air circumferentially of the covering.

3. A rotary tableting machine as defined in claim 1 wherein the powder inside the covering is collected by a dust collector having a front end extending into the covering through a dust collecting aperture formed in a side wall of the covering.

4. A rotary tableting machine as defined in claim 1 wherein the upper end of the covering is inserted into a laterally open groove formed in the outer peripheral surface of an upper portion of the upper punch holding disc, with a small clearance provided between the upper end and the grooved portion.

5. A rotary tableting machine as defined in claim 1 wherein a lower portion of the covering is bent inward to a U-shaped section and the end of the bent portion is inserted into a downwardly open groove formed in the under side of a powder receiving portion of the lower punch holding disc.

6. A rotary tableting machine as defined in claim 1 wherein the covering comprises a stand frame side cover, a feeder side upper cover and a feeder side lower cover, the covering being separable into the covers for removal.

7. A rotary tableting machine comprising a detachable covering enclosing a turntable, an upper punch holding disc and a lower punch holding disc to introduce clean air into the interior of the covering and to thereby collect powder scattered therein, the machine being wholly covered with a closure.

8. A rotary tableting machine as defined in claim 7 wherein the closure is attached to the outside surfaces of posts disposed at the four corners of the machine and to the outside surface of a quadrilateral frame joined to the top ends of the posts respectively.

9. A rotary tableting machine as defined in claim 8 wherein the posts and the frame comprise tubular members suitably maintained in communication with one another so that the clean air admitted to one of the posts is introduced via the posts and the frame into the interior of the covering and into the interior of the closure respectively.

10. A rotary tableting machine as defined in claim 9 wherein the clean air introduced into the interior of the covering and of the closure is discharged from the machine via the post along with the scattered powder.

* * * * *